(12) United States Patent
Pfeifer et al.

(10) Patent No.: US 9,258,212 B2
(45) Date of Patent: Feb. 9, 2016

(54) SUPPORTING ARBITRARY ROUTING CRITERIA IN SOFTWARE DEFINED NETWORKS

(71) Applicant: Cisco Technology, Inc., San Jose, CA (US)

(72) Inventors: Jason Pfeifer, El Dorado Hills, CA (US); Karen Cadora, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 13/843,536

(22) Filed: Mar. 15, 2013

(65) Prior Publication Data

US 2014/0269331 A1    Sep. 18, 2014

(51) Int. Cl.
| | | |
|---|---|---|
| *H04L 12/56* | (2006.01) | |
| *H04L 12/721* | (2013.01) | |
| *H04L 12/729* | (2013.01) | |
| *H04L 12/727* | (2013.01) | |
| *H04L 12/733* | (2013.01) | |
| *H04L 12/725* | (2013.01) | |

(52) U.S. Cl.
CPC ............ *H04L 45/124* (2013.01); *H04L 45/121* (2013.01); *H04L 45/125* (2013.01); *H04L 45/126* (2013.01); *H04L 45/302* (2013.01)

(58) Field of Classification Search
CPC ...................... H04M 15/8044; H04M 15/8055; H04M 15/82; H04M 15/835; G06F 9/541; H04L 41/0816; H04L 41/5096; H04L 67/10; H04L 67/1008; H04L 67/1025; H04L 67/1029; H04L 67/16; H04L 67/327; H04L 45/42; H04L 45/56
See application file for complete search history.

(56) References Cited

U.S. PATENT DOCUMENTS

| | | | |
|---|---|---|---|
| 7,236,488 B1 * | 6/2007 | Kavipurapu | 370/388 |
| 2006/0168592 A1 * | 7/2006 | Andrews et al. | 719/318 |
| 2006/0268828 A1 | 11/2006 | Yarlagadda | |
| 2010/0284287 A1 | 11/2010 | Venuto | |
| 2012/0087368 A1 | 4/2012 | Kunarathnam et al. | |
| 2013/0163475 A1 * | 6/2013 | Beliveau et al. | 370/257 |

OTHER PUBLICATIONS

International Search Report for PCT/US2014/022453, Jul. 7, 2014.

\* cited by examiner

*Primary Examiner* — David Oveissi

(74) *Attorney, Agent, or Firm* — Patterson + Sheridan, LLP

(57) ABSTRACT

System, method, and computer program product to route data communications based on non-routing criteria, by receiving, by a network element, a data packet, identifying, in a routing table of the network element, a first route for routing the data packet, computing, by an application executing on the network element, a routing score for the first route based on one or more non-routing criteria, computing, by the application, a routing score for a second route for routing the data packet based on the one or more non-routing criteria, and upon determining that the routing score for the second route is less than the routing score of the first route, updating the routing table to cause the network element to route the data packet according to the second route.

21 Claims, 6 Drawing Sheets

SUPPORTING ARBITRARY ROUTING CRITERIA IN SOFTWARE DEFINED NETWORKS

TECHNICAL FIELD

Embodiments presented in this disclosure generally relate to software defined networks. More specifically, embodiments disclosed herein provide software defined networks which support arbitrary routing criteria.

BACKGROUND

Routing protocols have been designed to take into account a number of network-related conditions in creating and maintaining routes, such as reachability and network congestion. Currently, however, there is no way to route based upon non-network related conditions, such as dynamic latency, service level agreements, identity conditions, bandwidth, or contractual arrangements requiring a certain amount of traffic to flow via a given provider, as incorporating these capabilities into a switch is prohibitive to do for each individual customer.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1A:
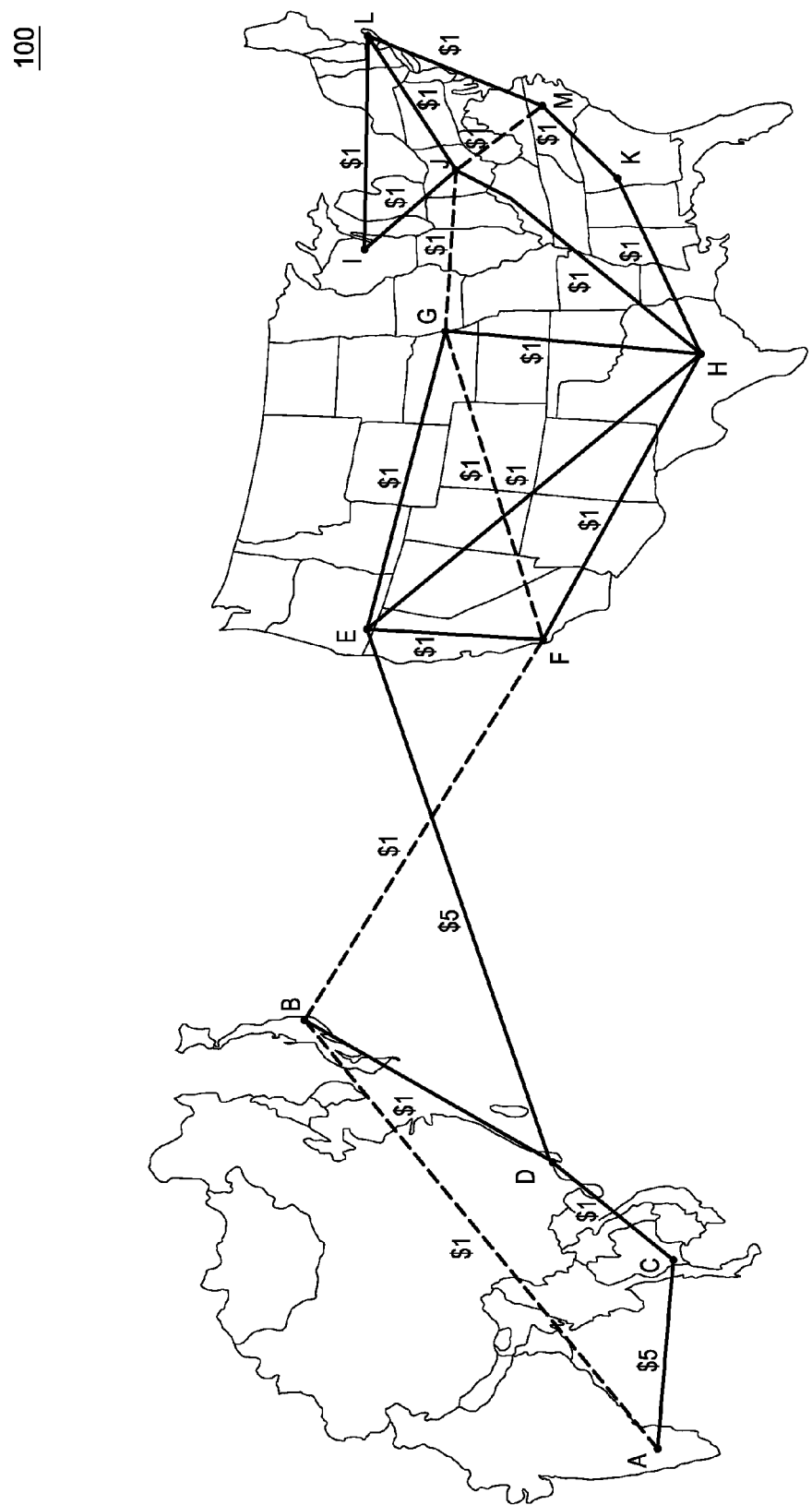
FIGS. 1A-1C are diagrams illustrating techniques for supporting arbitrary routing criteria in SDN enabled networks, according to one embodiment disclosed herein.

Embodiments disclosed herein provide a method to route data communications based on non-routing criteria, by receiving, by a network element, a data packet, identifying, in a routing table of the network element, a first route for routing the data packet, computing, by an application executing on the network element, a routing score for the first route based on one or more non-routing criteria, computing, by the application, a routing score for a second route for routing the data packet based on the one or more non-routing criteria, and upon determining that the routing score for the second route is less than the routing score of the first route, updating the routing table to cause the network element to route the data packet according to the second route.

DESCRIPTION OF EXAMPLE EMBODIMENTS

Embodiments disclosed herein enable network programmability to define rules, at a network level, for data forwarding and traffic classification. A user may define policies in a policy engine to control routing actions of the network element within the network, allowing traffic control based on parameters that are not normally used for conventional network protocols, including, e.g., identity considerations, cost considerations, contractual considerations, and weather considerations, or any other arbitrary criteria. For example, in one embodiment, the policy engine may optimize routing for lowest cost (in terms of currency), by evaluating transmission costs and shifting traffic to lowest cost links. In another embodiment, the policy is optimized for customer experience, and shifts traffic to protect service level agreements (SLAs). Taking full advantage of the programmable aspects of a software defined networking (SDN) enabled network, embodiments disclosed herein allow a broad variety of non-traditional routing criteria to influence routing and forwarding decisions.

Software defined networking (SDN) allows networks, traditionally static entities, to become more dynamic in nature. SDN opens data networking to application developers, who may write applications to manage network elements and the data flows passing through them, without requiring physical access to the network elements themselves. Rather than network elements being just "appliances," SDN considers network hardware to be part of a distributed computational system that can be manipulated by software. An application developer writing applications for an SDN may execute the application on any device which can access the network. The application may execute commands and apply functions to the network devices (and the data flows therein) remotely, or locally on the network element itself. Using applications in an SDN, developers may manage networking behavior of a network element, including routing, quality of service (QoS), and bandwidth allocation, as well as manage the network elements themselves. More specifically, applications executing in a SDN, such as a routing policy engine, may modify routes in the SDN based on any software defined networking criteria. Additionally, different programming logic may be applied to different flows or packets in the same network topology, such that each network graph need not have its own instance of the SDN application.

The descriptions of various embodiments below are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a policy engine or related data available in the cloud. For example, the policy engine could execute on a network element in the cloud. An operator of a physical data center in the cloud providing cloud services may use the policy engine to alter, control, or otherwise determine routing and forwarding controls for traffic generated by cloud customers (e.g., customers hosting virtual machine instances, networked by virtual networks) based on non-routing criteria relevant to the service provider. In such a case, the policy engine could store modified routes and data related to the non-traditional routing criteria at a storage location in the cloud. Doing so allows a user to access this information from any computing system attached to a network connected to the cloud (e.g., the Internet).

FIG. 1A is a diagram 100 illustrating techniques for supporting arbitrary routing criteria in SDN enabled networks, according to one embodiment disclosed herein. Generally, the diagram 100 illustrates a graph of a plurality of network elements each represented by nodes A-M. The edges linking each of the nodes A-M have an associated dollar cost, which indicates the cost of transmitting a data packet between different nodes. For example, the cost of transmitting a packet from node D to node E, as shown, is $5, while the cost of transmitting a packet from node B to node F is $1. A routing information base (RIB) in each node may specify routes by which data packets are forwarded in order for the data packets to reach their intended bases. The RIB may implement a plurality of different routing protocols in order to determine the most efficient routes, including but not limited to Open Shortest Path First (OSPF), Intermediate System to Intermediate System (IS-IS), and Enhanced Interior Gateway Routing Protocol (EIGRP). For example, in order to transmit data packets from node A to node M, a route including nodes A, B, F, G, J, and M. This route is depicted in FIG. 1A by a dotted line for the sake of clarity. In one embodiment, this route is selected because it has the lowest cost of transmitting data from node A to node M. Generally, the route may be selected by any suitable criteria.

Due to a variety of factors, however, the cost (or other metrics) of routing along the edges in the graph may change. In one embodiment, a policy engine allows users to define and route/forward traffic based on these attributes. For example, the policy engine may compute the cost (or other metric) of transmitting data packets from source to destination. When the policy engine determines that another route, based on the non-traditional routing criteria, is more efficient than the route currently defined in the RIB (or a route used by the policy engine to override the route currently defined in the RIB), the policy engine may override the route in the RIB and replace it with the more efficient route.

The policy engine may execute on the network elements themselves or on a computing device external to the network element. In either case, the policy engine, can override the routing decisions of the network element. The network elements described herein provide a plurality of application programming interfaces (APIs), which may be used to allow control of the network element, including but not limited to its functions, attributes, and routing engine. Specifically, by providing an interface to the routing engine of the network element, applications using the APIs may determine routes based on non-traditional routing criteria, overriding the default routing decisions of the network element.

Figure 1B:
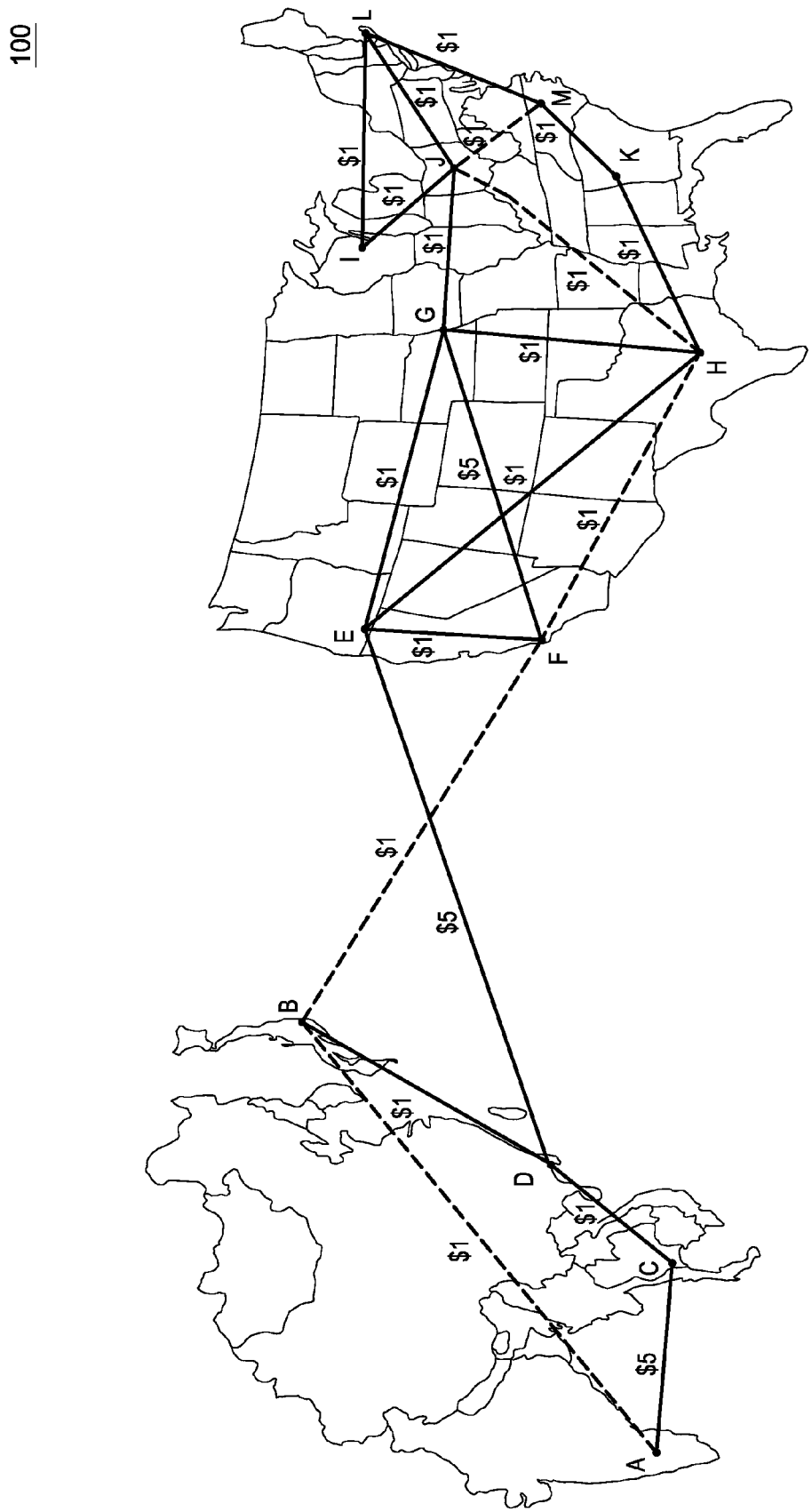

FIG. 1B is a diagram 100 illustrating techniques for supporting arbitrary routing criteria in SDN enabled networks, according to one embodiment disclosed herein. In FIG. 1B, the cost of the route between nodes F and G is now $5, whereas in FIG. 1A, the corresponding cost was $5. The cost may have risen for any number of reasons, including, but not limited to, exceeding service provider data caps that specify any data transferred up to a limit costs $1, but once that limit is exceeded, the data transfer costs $5. As another example, the service provider may charge a premium during peak hours, and provide price breaks during off peak hours and weekends. A policy engine monitoring the total volume of data transferred between nodes F and G may determine that the data limit has been exceeded (or that peak hours have started), and the cost has now risen to $5. Based on this determination, the policy engine may compute a score for the route A, B, F, G, J, and M between nodes A-M, which may be based on a total dollar cost. For example, the score for the route A, B, F, G, J, and M may now be $9, which may be determined by summing the total costs of each segment. In another embodiment, the cost of a portion of a route to substitute the F-G route segment may be computed. Once the policy engine has a score for the A, B, F, G, J, and M route, it may calculate the costs of a plurality of other routes from node A to node M. For example, the policy engine may compute a cost of $5 for the route including nodes A, B, F, H, J, and M. By comparing the costs of each route, the policy engine may determine that the cost of the route A, B, F, H, J, and M is less than the cost of the route A, B, F, G, J, and M, and cause the route to be changed from A, B, F, G, J, and M to A, B, F, H, J, and M. The policy engine may then communicate to each node the necessary information required to change the routing paths.

In another example, the policy engine may observe that a service level agreement (SLA) requires that data communications traffic should pass through the geographic region within which node H is located. The policy engine may identify the physical location of the network element represented by node H and determine that it is within the mandated geographic region. In making such a determination, scores for routes may be based on whether each route passes through the mandated geographic region. If the route includes the mandated geographic region, the score may be lowered to reflect a more desirable route. If the route does not include the mandated geographic region, the score may be increased to reflect the less desirable route. Embodiments disclosed herein contemplate any type of scoring scale sufficient to indicate a preference of one route over another. For example, the more desirable route may be reflected by the highest score. Once the most desirable route is identified, (which may be based on the lowest cost route including the mandated geographic region) the policy engine may override default or currently existing routes to implement the most desirable route.

In yet another example, the policy engine may use weather conditions to influence the scores of each route. For example, if a blizzard was occurring in the geographic region including node B, there may be a strong possibility of service outages and delays. In such an event, the policy engine may look for other routes having no significant impact from weather conditions. For each route, a score may be calculated based on the possible adverse effects of weather conditions. For example, if one area had a 100% chance of a blizzard, while another area had a 50% chance of the same blizzard, the scores for each route could be weighted accordingly. If the score for routes including node B is greater than another route not including node B, the policy engine may override the routing tables of each node such that no (or less) data is routed through node B.

In still another example, the policy engine may use the identity of a user as a criterion for affecting routing in the SDN enabled network. For example, the policy engine may prioritize the data coming from all devices used by the CEO of a corporation. In order to do so, the policy engine may compute a priority score for all network traffic, based on the identity of the person or user whose device originated the data. When the policy engine determines that data packets come from a user having high priority, the priority score for these data packets may be lowered (or raised, in some embodiments), to reflect the higher priority. The policy engine may then direct the network elements in the SDN enabled network to apply a greater priority to these packets, which may be delivered to their destination more quickly than without having the added priority.

In another example, the policy engine may use energy costs and use of specific network elements as routing criteria. Certain portions of the network may see reduced usage at certain times, and it may be economical to force the traffic to go through alternate routes so that lesser used network elements may be powered down to save energy. When other criteria become more important (such as an increase in traffic), the network elements may be repowered so that flows may go across them again.

Figure 1C:
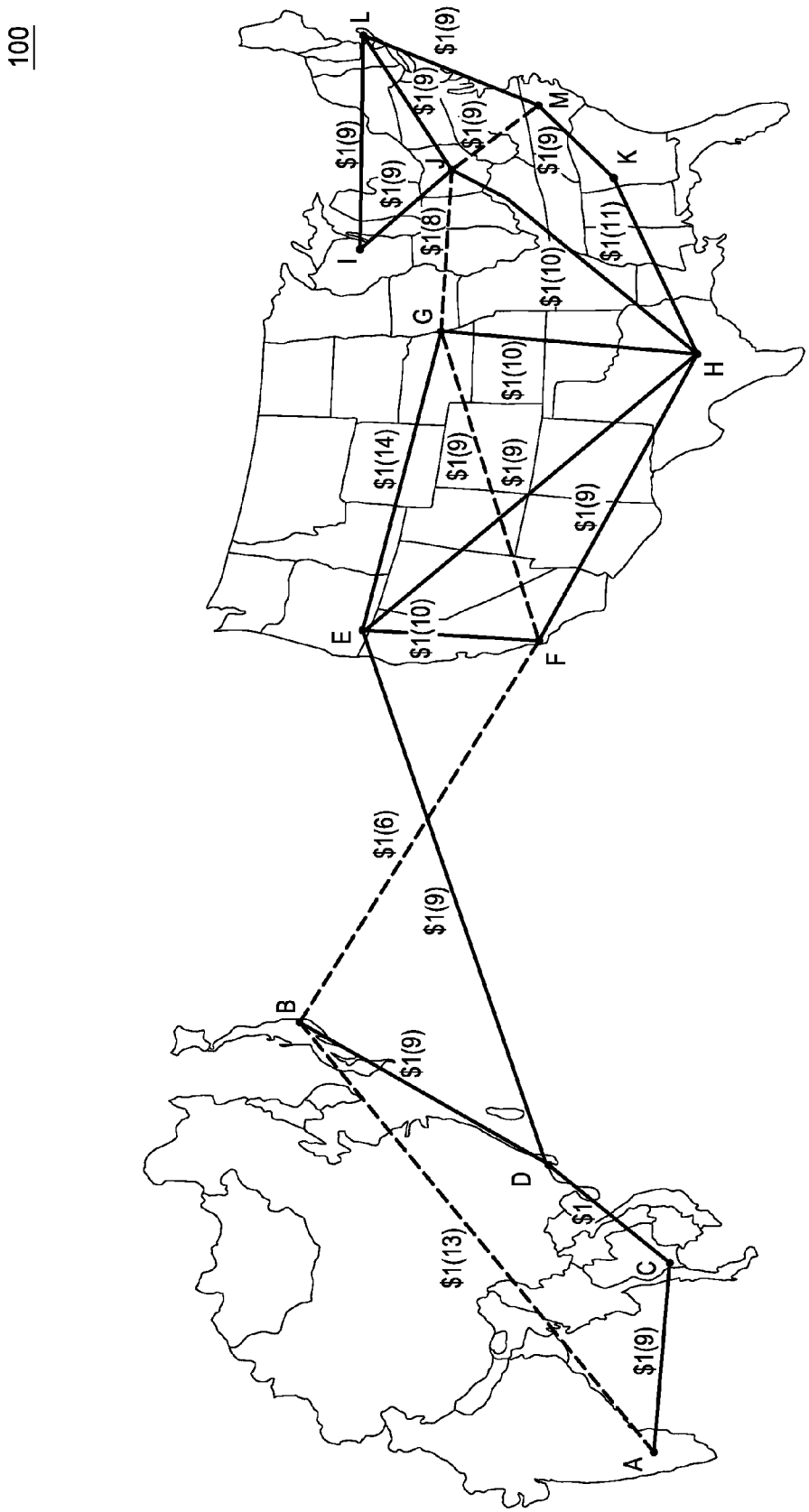

FIG. 1C is a diagram 100 illustrating techniques for supporting arbitrary routing criteria in SDN enabled networks, according to one embodiment disclosed herein. In FIG. 1C, the diagram 100 has been updated to include dynamically measured latency values (in parenthesis) for each link between the nodes A-M. Dynamically measured latency is not an attribute upon which routing decisions have traditionally been made. However, in a SDN enabled network, the latency values of each link may be collected and analyzed in order to find a path having the lowest total latency. The policy engine may use the latencies of each route between nodes A-M may to compute a score for each route, and the route having the lowest score (i.e., the lowest latency) may be selected to route all data between nodes A-M. As shown (in dotted lines), the route having the lowest latency between nodes A-M includes nodes A, B, F, G, J, and M. The policy engine may therefore select the route including nodes A, B, F, G, J, and M as the preferred route, and override an existing route that has a higher latency (or score) than this route. The route being overridden may be defined in the routing table of the network elements, or may be another route that the policy engine used to override a route defined in the routing table. In making a decision to select a new route based on latency, the policy engine may measure latencies over a period of time, such that minor fluctuations in latency do not result in changes to the routes.

Figure 2:
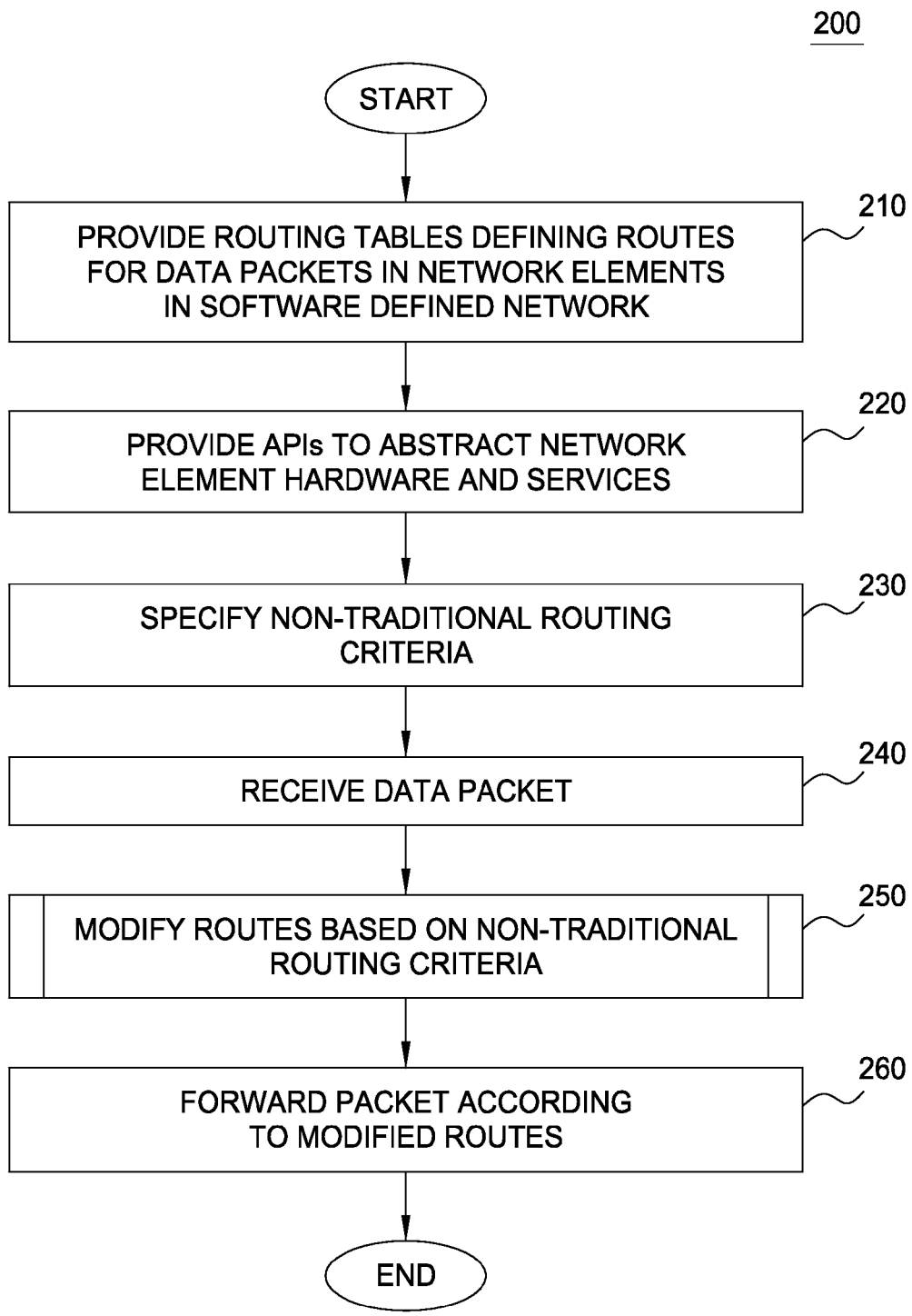
FIG. 2 illustrates a method to support arbitrary routing criteria in SDN enabled networks, according to one embodiment disclosed herein.

FIG. 2 illustrates a method 200 to support arbitrary routing criteria in SDN enabled networks, according to one embodiment disclosed herein. Generally, the steps of the method 200 allow network routes to be modified dynamically based on non-traditional routing criteria, including, but not limited to dollar costs, latency, weather conditions, energy costs, and user identities. At step 210, routing tables defining routes for data packets are provided for a plurality of network elements in a SDN enabled network. At step 330, application program interfaces (APIs) are provided to abstract network element hardware and services. For example, the APIs may grant an external (or local) application abstracted access to the routing engine and RIB of the network elements, such that their default routing decisions may be overridden by the policy engine which has identified more advantageous routes. At step 230, one or more non-traditional routing criteria are specified. Examples of criteria include dollar cost, latency, geographical constraints, contractual provisions, service level agreements, and weather conditions, among others. At step 240, data packets are received by a network element. At step 250, described in greater detail with reference to FIG. 3, the policy engine may modify the predefined routes according to the non-traditional routing criteria. At step 260, the network element may forward the data packets according to the modified routes.

Figure 3:
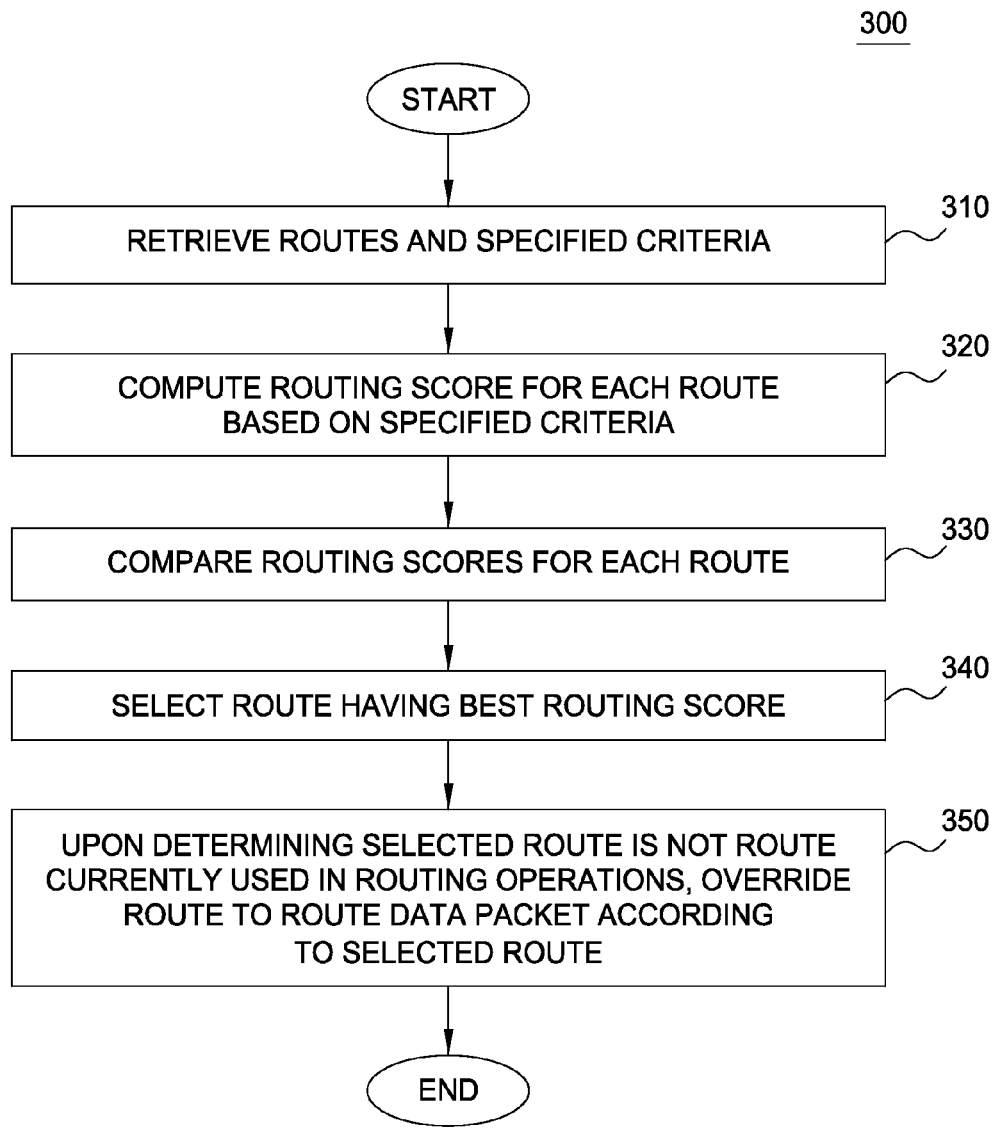
FIG. 3 illustrates a method to modify routes based on non-traditional routing criteria, according to one embodiment disclosed herein.

FIG. 3 illustrates a method 300 to modify routes based on non-traditional routing criteria, according to one embodiment disclosed herein. Generally, the steps of the method 300 score a plurality of different routes based on one or more non-traditional routing criteria in order to determine whether better routes exist to route data than the routes currently being used. In one embodiment, a policy engine executes the steps of the method 300. At step 310, the policy engine retrieves routes and specified criteria. The routes may be defined in a routing table in a network element, and the policy engine may use one or more APIs to read the routes in the routing table. The policy engine may also compute a plurality of other routes based on network topology information retrieved from the network elements in the SDN enabled network. The predefined criteria may include, but are not limited to, dollar cost, latency, geographical constraints, contractual provisions, service level agreements, energy costs, and weather conditions, or any combination thereof. At step 320, the policy engine computes a routing score for each route based on the specified criteria. The routing score may reflect the route's ability to route based on the specified criteria. For example, the routing score may reflect an overall cost or latency for each route. At step 330, the policy engine may compare the routing scores for each route. At step 340, the policy engine selects the route having the best routing score. Embodiments disclosed herein contemplate any scale able to indicate a relative priority between routes. For example, a higher routing score may reflect a lower latency, and the higher overall routing score may reflect the lowest latency, and therefore the more desirable route. As another example, the lowest routing score may reflect a lower dollar cost to route data, with the lower overall routing score indicating a superior route. At step 350, upon determining that the selected route is not the route currently implemented in all routing operations, the route defined in the routing table is overridden in order to route the data packet according to the selected route.

Figure 4:
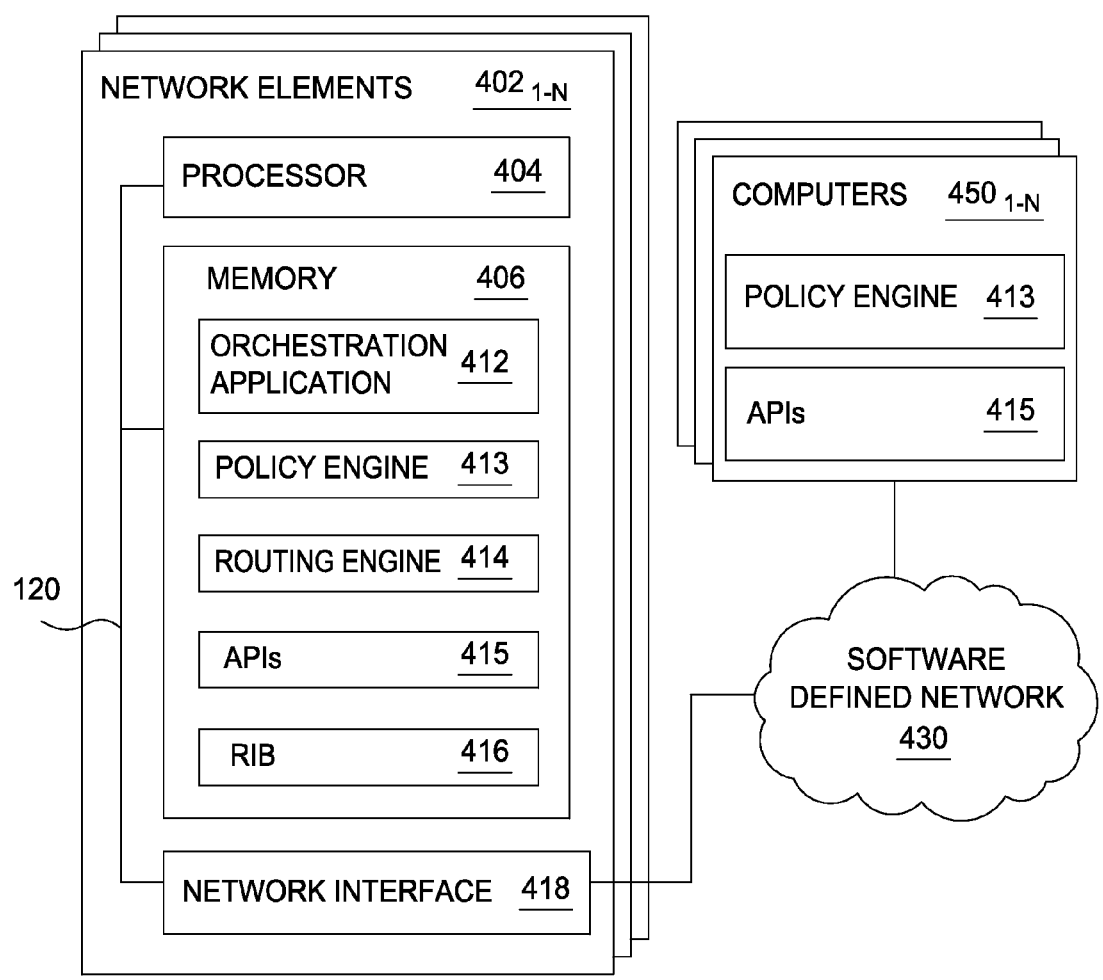
FIG. 4 illustrates a system to support arbitrary routing criteria in SDN enabled networks, according to one embodiment disclosed herein.

FIG. 4 illustrates a system 400 to support arbitrary routing criteria in SDN enabled networks, according to one embodiment disclosed herein. As shown, a plurality of network elements $402_{1-N}$ are connected via a SDN enabled network 430. A plurality of computers $450_{1-N}$ are also connected to the network elements $402_{1-N}$ through the SDN enabled network 430. In general, the SDN enabled network 430 may be a telecommunications network and/or a wide area network (WAN). In a particular embodiment, the SDN enabled network 430 is the Internet.

The network elements $402_{1-N}$ generally include a processor 404 connected via a bus 420 to a memory 406, and a network interface device 418. The network elements $402_{1-N}$ are configured to execute containerized software applications. The network elements $402_{1-N}$ are generally under the control of an operating system (not shown). Examples of operating systems include the UNIX® operating system, distributions of the Linux® operating system, and the IOS operating system by Cisco Systems®. The processor 404 is included to be representative of a single CPU, multiple CPUs, a single CPU having multiple processing cores, and the like. The processor 404 may execute software developed for the purposes of embodiments disclosed herein. Similarly, the memory 406 may be a random access memory. While the memory 406 is shown as a single identity, it should be understood that the memory 406 may comprise a plurality of modules, and that the memory 406 may exist at multiple levels, from high speed registers and caches to lower speed but larger DRAM chips. The network interface device 418 may be any type of network communications device allowing the network elements $402_{1-N}$ to communicate with other network elements $402_{1-N}$ and computers $450_{1-N}$ via the SDN enabled network 430.

As shown, the memory 406 contains an orchestration application 412, which is an application generally configured to orchestrate automation and programmability of the network elements $402_{1-N}$ in the SDN enabled network 430. Generally, the orchestration application 412 provides a plurality of APIs used to abstract the implementation specific details of the network elements $402_{1-N}$ in the SDN enabled network 430. Stated differently, the orchestration application 412 is an abstraction tool that permits a programmer or network administrator to access and monitor different functions and outputs of network elements $402_{1-N}$ in the SDN enabled network 430. By using the orchestration application 412, functional programming techniques may be used to program a wide range of network elements $402_{1-N}$, regardless of the wide array of distinctions found between specific network elements $402_{1-N}$. In particular, the orchestration application 412 may provide an interface to allow an application, such as the policy engine 413, to read, write and modify the routing table and routing engine 413 of a network element $402_{1-N}$.

The memory 406 also contains a policy engine 413, which is an application generally configured to modify routing policies based on non-traditional networking criteria. For example, the policy engine 413 may modify routes based on dollar cost, latency, geographical constraints, contractual provisions, service level agreements, energy costs, and weather conditions, or any combination thereof. Upon determining that a better route exists than the route currently used to route data, the policy engine 413 may issue commands to change the routing engine 414 and RIB 416 of the network elements $402_{1-N}$. The policy engine 413 may use the APIs 415, provided by the orchestration application 412, to modify the RIB and routing engine 414 of the network elements $402_{1-N}$. The routing engine 414 of the network elements $402_{1-N}$ is an application generally configured to execute the core networking functions of the respective network element. The routing engine may interact with the routing information base (RIB) 416, also referred to as a routing table, which specifies a plurality of rules used by the routing engine 414 to route packets received on an ingress port (not shown) of the network elements $402_{1-N}$ to a proper egress port (not shown) of the network elements $402_{1-N}$. In one embodiment, the RIB 416 of each respective network element $402_{1-N}$ includes immediate topology information of the SDN enabled network 130, i.e., what other network elements a respective network element is connected to, and so on.

As shown, the memory 406 also contains the application programming interfaces (APIs) 415, which stores the APIs provided by the orchestration application 412 to the policy engine 413. In one embodiment, the APIs 415 are an integrated component of the orchestration application 412 or the policy engine 413. The APIs 415 gather data associated with the different functions of the network elements $402_{1-N}$, such as statistics associated with the network element, routing tables, status of the network elements, topology information, errors, and the like. Moreover, APIs 415 may also permit a programmer or network administrator to control the functions of the network elements $402_{1-N}$ such as change settings in the forwarding engine, change the state of the network elements $402_{1-N}$, etc. An application, therefore, such as the policy engine 413 may use the APIs 415 to send commands to the network elements $402_{1-N}$.

By abstracting the RIB 416 of the network elements $402_{1-N}$ using the APIs 415, the orchestration application may permit a network administrator to monitor and control a plurality of different types of network elements $402_{1-N}$ that each may use proprietary firmware. One such product that permits this function is the One Platform Kit (onePK) software development kit (SDK) by Cisco® (a registered trademark in the United States many other jurisdictions).

The computers $450_{1-N}$ may be capable of executing applications, such as the policy engine 413, which may utilize the functionality of the APIs 415 provided by the orchestration application 412. Therefore, in one embodiment, the orchestration application 412, the policy engine 413, and other user applications may be executed on one or more of the computers $450_{1-N}$ in order to modify the routing behavior (or any behavior) of the network elements $402_{1-N}$. In still another embodiment, the computers $450_{1-N}$ may be blade servers which execute the orchestration application 412 and the policy engine 413 in the SDN enabled network 430.

Advantageously, embodiments disclosed herein extend a network element's ability to route, such that routing decisions may be made based on non-traditional criteria, which include, but are not limited to dollar cost, latency, geographical constraints, contractual provisions, service level agreements, and weather conditions, or any combination thereof.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method to route data communications in a software defined network (SDN) based on arbitrary routing criteria, comprising:
    receiving, by a network element in the SDN, a data packet;
    identifying, in a routing table stored in a routing information base (RIB) of the network element, a first network route used by the network element to route the data packet to a destination, wherein the first network route comprises a first set of network elements in the SDN;
    computing, by an application executing on the network element, a first network routing score for the first network route based on one or more arbitrary routing criteria;
    computing, by the application, a second network routing score for a second network route for routing the data packet based on the one or more arbitrary routing criteria, wherein the second network route comprises a second set of network elements in the SDN; and
    upon determining that the second network routing score is less than the first network routing score, updating, by the application via an application programming interface (API) provided by the network element, the routing table to cause the network element to route the data packet to the destination by the second set of network elements according to the second network route.

2. The method of claim 1, wherein the one or more arbitrary routing criteria comprises a cost of transmitting the data packet, wherein the first routing network score reflects a cost of transmitting the data packet by the first set of network elements according to the first network route, wherein the second network routing score reflects a cost of transmitting the data packet by the second set of network elements according to the second network route.

3. The method of claim 1, wherein the one or more arbitrary routing criteria comprises a latency, wherein the first network routing score reflects a latency experienced when transmitting the data packet by the first set of network elements according to the first network route, wherein the second network routing score reflects a latency experienced when transmitting the data packet by the second set of network elements according to the second network route.

4. The method of claim 1, wherein the one or more arbitrary routing criteria comprises a geographic constraint, wherein the geographic constraint specifies a geography within which the data packet must remain, wherein the first network routing score reflects whether transmitting the data packet by the first set of network elements according to the first network route satisfies the geographic constraint, wherein the second routing score reflects whether transmitting the data packet by the second set of network elements according to the second network route satisfies the geographic constraint.

5. The method of claim 1, wherein the one or more arbitrary routing criteria comprises a weather condition, wherein the first network routing score reflects whether a weather condition experienced on the first route adversely affects routing the data packet by the first set of network elements according to the first network route, wherein the second routing score reflects whether a weather condition experienced on the second route adversely affects routing the data packet by the second set of network elements according to the second network route.

6. The method of claim 1, wherein the API allows the application to access and modify the routing table, wherein the API abstracts the routing table of the network element to permit the application to read from the routing table and update the routing table, wherein the application specifies the arbitrary routing criteria.

7. The method of claim 6, wherein a second application is executed by a computing device external to the specified network element and communicably coupled to the network element, wherein the second application computes the first and second network routing scores based on the one or more arbitrary routing criteria, wherein the second application uses the API to update the routing table of the network element, wherein at least one network element in the first and second sets of network elements are communicably coupled to the destination, wherein the one or more arbitrary routing criteria comprise each of: (i) a cost of transmitting the data packet, (ii) a geographic constraint, and (iii) a weather condition.

8. A system, comprising:
one or more computer processors; and
a memory containing a program, which when executed by the one or more computer processors, performs an operation to route data communications in a software defined network (SDN) based on arbitrary routing criteria, the operation comprising:
receiving, by a network element in the SDN, a data packet;
identifying, in a routing table stored in a routing information base (RIB) of the network element, a first network route used by the network element to route the data packet to a destination, wherein the first network route comprises a first set of network elements in the SDN;
computing, by an application executing on the network element, a first network routing score for the first network route based on one or more arbitrary routing criteria;
computing, by the application, a second network routing score for a second network route for routing the data packet based on the one or more arbitrary routing criteria, wherein the second network route comprises a second set of network elements in the SDN; and
upon determining that the second network routing score is less than the first network routing score, updating, by the application via an application programming interface (API) provided by the network element, the routing table to cause the network element to route the data packet to the destination by the second set of network elements according to the second network route.

9. The system of claim 8, wherein the one or more arbitrary routing criteria comprises a cost of transmitting the data packet, wherein the first routing network score reflects a cost of transmitting the data packet by the first set of network elements according to the first network route, wherein the second network routing score reflects a cost of transmitting the data packet by the second set of network elements according to the second network route.

10. The system of claim 8, wherein the one or more arbitrary routing criteria comprises a latency, wherein the first network routing score reflects a latency experienced when transmitting the data packet by the first set of network elements according to the first network route, wherein the second network routing score reflects a latency experienced when transmitting the data packet by the second set of network elements according to the second network route.

11. The system of claim 8, wherein the one or more arbitrary routing criteria comprises a geographic constraint, wherein the geographic constraint specifies a geography within which the data packet must remain, wherein the first network routing score reflects whether transmitting the data packet by the first set of network elements according to the first network route satisfies the geographic constraint, wherein the second routing score reflects whether transmitting the data packet by the second set of network elements according to the second network route satisfies the geographic constraint.

12. The system of claim 8, wherein the one or more arbitrary routing criteria comprises a weather condition, wherein the first network routing score reflects whether a weather condition experienced on the first route adversely affects routing the data packet by the first set of network elements according to the first network route, wherein the second routing score reflects whether a weather condition experienced on the second route adversely affects routing the data packet by the second set of network elements according to the second network route.

13. The system of claim 8, wherein the API allows the application to access and modify the routing table, wherein the API abstracts the routing table of the network element to permit the application to read from the routing table and update the routing table, wherein the application specifies the arbitrary routing criteria.

14. The system of claim 13, wherein a second application is executed by a computing device external to the specified network element and communicably coupled to the network element, wherein the second application computes the first and second network routing scores based on the one or more arbitrary routing criteria, wherein the second application uses the API to update the routing table of the network element, wherein at least one network element in the first and second sets of network elements are communicably coupled to the destination, wherein the one or more arbitrary routing criteria comprise each of: (i) a cost of transmitting the data packet, (ii) a geographic constraint, and (iii) a weather condition.

15. A computer program product to route data communications in a software defined network (SDN) based on arbitrary routing criteria, comprising:
a non-transitory computer-readable storage medium having computer-readable program code embedded therewith, the computer-readable program code executable by a processor to perform an operation comprising:
receiving, by a network element in the SDN, a data packet;
identifying, in a routing table stored in the network element, a first network route used by the network element to route the data packet to a destination, wherein the first network route comprises a first set of network elements in the SDN;

computing, by an application executing on the network element, a first network routing score for the first network route based on one or more arbitrary routing criteria;

computing, by the application, a second network routing score for a second network route for routing the data packet based on the one or more arbitrary routing criteria, wherein the second network route comprises a second set of network elements in the SDN; and upon determining that the second network routing score is less than the first network routing score, updating the routing table to cause the network element to route the data packet by the second set of network elements according to the second network route.

16. The computer program product of claim 15, wherein the one or more arbitrary routing criteria comprises a cost of transmitting the data packet, wherein the first routing network score reflects a cost of transmitting the data packet by the first set of network elements according to the first network route, wherein the second network routing score reflects a cost of transmitting the data packet by the second set of network elements according to the second network route.

17. The computer program product of claim 15, wherein the one or more arbitrary routing criteria comprises a latency, wherein the first network routing score reflects a latency experienced when transmitting the data packet by the first set of network elements according to the first network route, wherein the second network routing score reflects a latency experienced when transmitting the data packet by the second set of network elements according to the second network route.

18. The computer program product of claim 15, wherein the one or more arbitrary routing criteria comprises a geographic constraint, wherein the geographic constraint specifies a geography within which the data packet must remain, wherein the first network routing score reflects whether transmitting the data packet by the first set of network elements according to the first network route satisfies the geographic constraint, wherein the second routing score reflects whether transmitting the data packet by the second set of network elements according to the second network route satisfies the geographic constraint.

19. The computer program product of claim 15, wherein the one or more arbitrary routing criteria comprises a weather condition, wherein the first network routing score reflects whether a weather condition experienced on the first route adversely affects routing the data packet by the first set of network elements according to the first network route, wherein the second routing score reflects whether a weather condition experienced on the second route adversely affects routing the data packet by the second set of network elements according to the second network route.

20. The computer program product of claim 15, wherein the API allows the application to access and modify the routing table, wherein the API abstracts the routing table of the network element to permit the application to read from the routing table and update the routing table, wherein the application specifies the arbitrary routing criteria.

21. The computer program product of claim 20, wherein a second application is executed by a computing device external to the specified network element and communicably coupled to the network element, wherein the second application computes the first and second network routing scores based on the one or more arbitrary routing criteria, wherein the second application uses the API to update the routing table of the network element, wherein at least one network element in the first and second sets of network elements are communicably coupled to the destination, wherein the one or more arbitrary routing criteria comprise each of: (i) a cost of transmitting the data packet, (ii) a geographic constraint, and (iii) a weather condition.

* * * * *